United States Patent
Cha et al.

(10) Patent No.: US 9,204,506 B2
(45) Date of Patent: Dec. 1, 2015

(54) LIGHT EMITTING DIODE DRIVING APPARATUS

(71) Applicant: SAMSUNG ELECTRO-MECHANICS CO., LTD., Suwon-Si, Gyeonggi-Do (KR)

(72) Inventors: Sang Hyun Cha, Suwon-Si (KR); Yun Joong Lee, Suwon-Si (KR); Je Hyeon Yu, Suwon-Si (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 0 days.

(21) Appl. No.: 14/288,134

(22) Filed: May 27, 2014

(65) Prior Publication Data

US 2015/0115822 A1    Apr. 30, 2015

(30) Foreign Application Priority Data

Oct. 31, 2013 (KR) .......................... 10-2013-0131598

(51) Int. Cl.
*H05B 41/34* (2006.01)
*H05B 33/08* (2006.01)
*H05B 39/09* (2006.01)

(52) U.S. Cl.
CPC ........ *H05B 33/0815* (2013.01); *H05B 33/0803* (2013.01); *H05B 41/34* (2013.01)

(58) Field of Classification Search
CPC ..... H04B 41/34; H04B 33/0803; H04B 39/09
USPC .............................. 315/200 R, 201, 205, 208
See application file for complete search history.

(56) References Cited

U.S. PATENT DOCUMENTS

| 2009/0147547 | A1* | 6/2009 | Yamashita ................. 363/21.16 |
| 2010/0244804 | A1 | 9/2010 | Zong et al. |
| 2011/0096574 | A1* | 4/2011 | Huang ........................ 363/21.18 |
| 2011/0228571 | A1* | 9/2011 | Lin et al. .................... 363/21.16 |
| 2011/0285307 | A1 | 11/2011 | Kimura et al. |
| 2012/0262961 | A1* | 10/2012 | Chien et al. ..................... 363/84 |
| 2013/0051088 | A1* | 2/2013 | Yamashita ................. 363/21.13 |
| 2014/0029315 | A1* | 1/2014 | Zhang et al. ............... 363/21.13 |
| 2014/0198540 | A1* | 7/2014 | Xu .............................. 363/21.12 |
| 2014/0328090 | A1* | 11/2014 | Takahashi et al. ......... 363/21.17 |

FOREIGN PATENT DOCUMENTS

KR    10-2011-0128731 A    11/2011

* cited by examiner

*Primary Examiner* — Dylan White
(74) *Attorney, Agent, or Firm* — McDermott Will & Emery LLP

(57) ABSTRACT

A light emitting diode (LED) driving apparatus includes a power converting unit and a driving controlling unit. The power converting unit switches input power to supply driving power to at least one LED. In one example, the driving controlling unit controls the supplying of the power based on a switching period of the power converting unit and a demagnetization time in the switching period. In another example, the driving controlling unit controls the supplying of the power based on the input power, a switching period of the power converting unit, and a drain voltage by the switching.

14 Claims, 3 Drawing Sheets

LIGHT EMITTING DIODE DRIVING APPARATUS

CROSS-REFERENCE TO RELATED APPLICATION

This application claims the benefit of Korean Patent Application No. 10-2013-0131598 filed on Oct. 31, 2013, with the Korean Intellectual Property Office, the disclosure of which is incorporated herein by reference.

BACKGROUND

The present disclosure relates to a light emitting diode (LED) driving apparatus capable of decreasing heat generated from a switch supplying power to a light emitting diode or blocking power supplied to a light emitting diode.

Recently, interest in and demand for light emitting diodes (LEDs) has increased.

A device using a light emitting diode may be manufactured to be relatively compact to thereby even be used in a location in which it is difficult to install an existing electronic product. Furthermore, in the case in which the light emitting diode is used as an illumination apparatus, it is easy to implement various colors of light and control levels of illuminance, such that the light emitting diode may be used as a system illumination apparatus appropriate for situations such as watching movies, reading, participating in a conference, and the like.

In addition, light emitting diodes consume an amount of power corresponding to approximately ⅛ of the power consumed by an incandescent lamp, have a lifespan of 50,000 to 100,000 hours, 5 to 10 times that the lifespan of an incandescent lamp, and are environmentally-friendly, being a mercury free light sources, and may allow for a large degree of design freedom.

Due to such characteristics, light emitting diode illumination projects have been promoted as a national projects in nations such as the United States, Japan, Australia, and others, as well as Korea.

Further, recently, in accordance with the development of a flat panel display technology, a flat panel display has been used in automobile instrument panels as well as in smartphones, game machines, and digital cameras. In the future, the application of such displays to devices related to people's daily lives, such as micro-thin televisions, transparent navigation devices, and the like, will be increased.

In flat panel displays, a thin film transistor liquid crystal display (TFT-LCD) is mainly used.

Since a Liquid Crystal Display (LCD), a display individually supplying data signals depending on image information to pixels arranged in a matrix form to control light transmittance of the pixels, thereby controlling a desired image, does not emit light itself, and is designed so as to display an image through having a backlight unit installed on a rear surface thereof.

Generally, a liquid crystal display has characteristics such as being lightweight, being relatively thin, low power consumption, and the like, such that application fields thereof have gradually increased. In accordance with this trend, liquid crystal displays have been used in office automation devices, audio/video devices, and the like.

As described above, since liquid crystal displays do not emit the light themselves, these devices require a separate light source known as a backlight. As such a backlight, a cold cathode fluorescent lamp (CCFL), an external electrode fluorescent lamp (EEFL), or the like, has been used.

Since a light emitting diode (hereinafter, referred to as an 'LED') consumes a lower amount of power than cold cathode fluorescent lamps and has a volume smaller than that of the cold cathode fluorescent lamp, the use of the LED as the backlight unit has increased.

Backlight using LEDs may be classified as direct type LED backlights and edge type LED backlights. Here, direct type LED backlights use a scheme of directing light directly toward an LCD panel by installing an LED chip module across an entire surface, while edge type LED backlights use a scheme of emitting light to the center of an LCD panel by installing an LED chip module only at an edge or edges thereof.

As described above, the LED of which the use has increased requires a driving apparatus for driving such an LED.

Generally, the LED is driven with direct current (DC) power having a level of several volts due to a structure thereof. Therefore, a separate means is required in order to connect the LED to an alternating current (AC) power supply to drive the LED with AC power.

That is, since the LED uses DC power, a switching mode power supply (SMPS) has been used in order to convert commercial AC power into DC power and convert a magnitude of a voltage required for lighting. In the case of using an SMPS, electrical efficiency increases, while a circuit may be relatively complicated. In addition, a switching mode is used, such that high frequency noise occurs, a lifespan is decreased due to the use of a capacitor and an inductor, and a power factor is decreased.

In addition, as another scheme, a current control type LED driving circuit using a switching regulator has been used. This circuit using the switching regulator has a structure in which a current flowing in an LED is adjusted by a switching type circuit and an operational amplifier, and is configured so as to adjust the current flowing in the LED by feeding back a voltage applied to a sensing resistor.

Since this scheme uses a switching scheme instead of a linear scheme, power consumption in a switching block is decreased, such that electricity efficiency is increased. Therefore, this scheme is widely used in the case in which a comparatively large amount of power is consumed.

As described above, the LED of which the use has increased requires the driving apparatus for driving the LED. As disclosed in the following Related Art Document, an LED driving apparatus according to the related art drives an LED of a secondary side by switching power rectified on a primary side and then transferring the switched power to the secondary side insulated from the primary side, in order to provide DC power in the case of converting AC power into DC power and then using the DC power. However, in the LED driving apparatus according to the related art, a GM amplifier is used in a control circuit for switching the power rectified at the primary side, and a separate capacitor having a high capacitance is required at an output terminal of the GM amplifier, such that a circuit area and a manufacturing cost are increased due to an external capacitor.

RELATED ART DOCUMENT (Patent Document 1) Korean Patent Laid-Open Publication No. 10-2011-0128731

SUMMARY

An aspect of the present disclosure may provide a light emitting diode (LED) driving apparatus that does not use a separate external capacitor by controlling switching of a power converting circuit based on a switching period of the power converting circuit and a demagnetization time in the switching period.

According to an aspect of the present disclosure, an LED driving apparatus may include: a power converting unit switching input power to supply driving power to at least one LED; and a driving controlling unit controlling the supplying of the power of the power converting unit based on a switching period of the power converting unit and a demagnetization time in the switching period.

The driving controlling unit may include: an operating unit performing an operation on the input power, the switching period of the power converting unit, and a drain voltage by the switching to provide a reference voltage; and a controlling unit controlling the switching of the power converting unit based on a feedback signal indicating the detected driving power and the reference voltage from the operating unit.

The operating unit may include: a first counter counting the switching period of the power converting unit; a first operational amplifier performing an operation on signals so that an output signal thereof conforms to a voltage level of the input power; a first digital to analog converter performing digital to analog conversion on the output signal of the first operational amplifier depending on a count value of the first counter; a second counter counting the demagnetization time of the power converting unit a second operational amplifier performing an operation on signals so that an output signal thereof conforms to an output signal of the first digital to analog converter; and a second digital to analog converter performing digital to analog conversion on the output signal of the second operational amplifier depending on a count value of the second counter and feeding a resultant signal back to the second operational amplifier.

The controlling unit may include: a first comparator comparing a feedback signal of the power converting unit and a preset reference signal with each other; a second comparator comparing the reference voltage from the operating unit and a detected voltage of a switching current of the power converting unit with each other; and an RS latch having a set terminal receiving a comparison result of the first comparator and a reset terminal receiving a comparison result of the second comparator and performing a logical operation on signals input to the set terminal and the reset terminal to control the switching of the power converting unit.

The power converting unit may include: a switch switching the input power; and a transformer having a primary winding receiving the input power, a secondary winding having a preset turns ratio with the primary winding and receiving a power induced from the primary winding, and an auxiliary winding having a preset turns ratio with the primary winding, detecting power induced from the primary winding to the secondary winding, and feeding the detected power back to the driving controlling unit.

The transformer may have a primary side and a secondary side on which electrical properties of a ground are different from each other, and the primary winding and the auxiliary winding maybe formed on the primary side and the secondary winding may be formed on the secondary side.

The LED driving apparatus may further include a rectifying unit rectifying an alternating current (AC) power to provide the input power to the power converting unit.

The driving controlling unit may be formed on the primary side.

According to another aspect of the present disclosure, an LED driving apparatus may include: a power converting unit switching input power to supply driving power to at least one LED; and a driving controlling unit controlling the supplying of the power of the power converting unit based on the input power, a switching period of the power converting unit, and a drain voltage by the switching.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
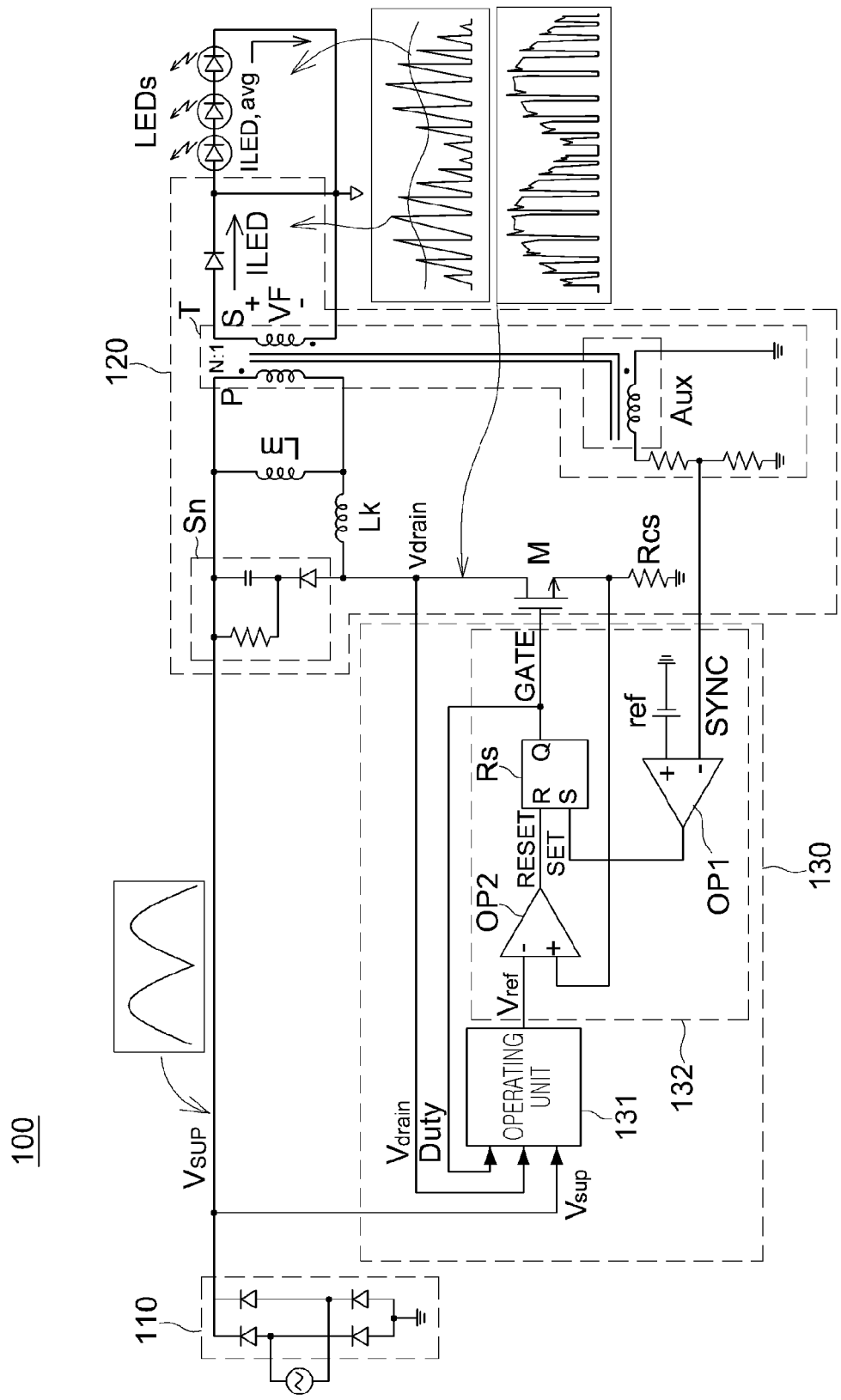
FIG. 1 is a circuit diagram showing a schematic configuration of a light emitting diode (LED) driving apparatus according to an exemplary embodiment of the present disclosure.

Exemplary embodiments of the present disclosure will now be described in detail with reference to the accompanying drawings. The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. Throughout the drawings, the same reference numerals will be used throughout to designate the same or like elements.

Figure 2:
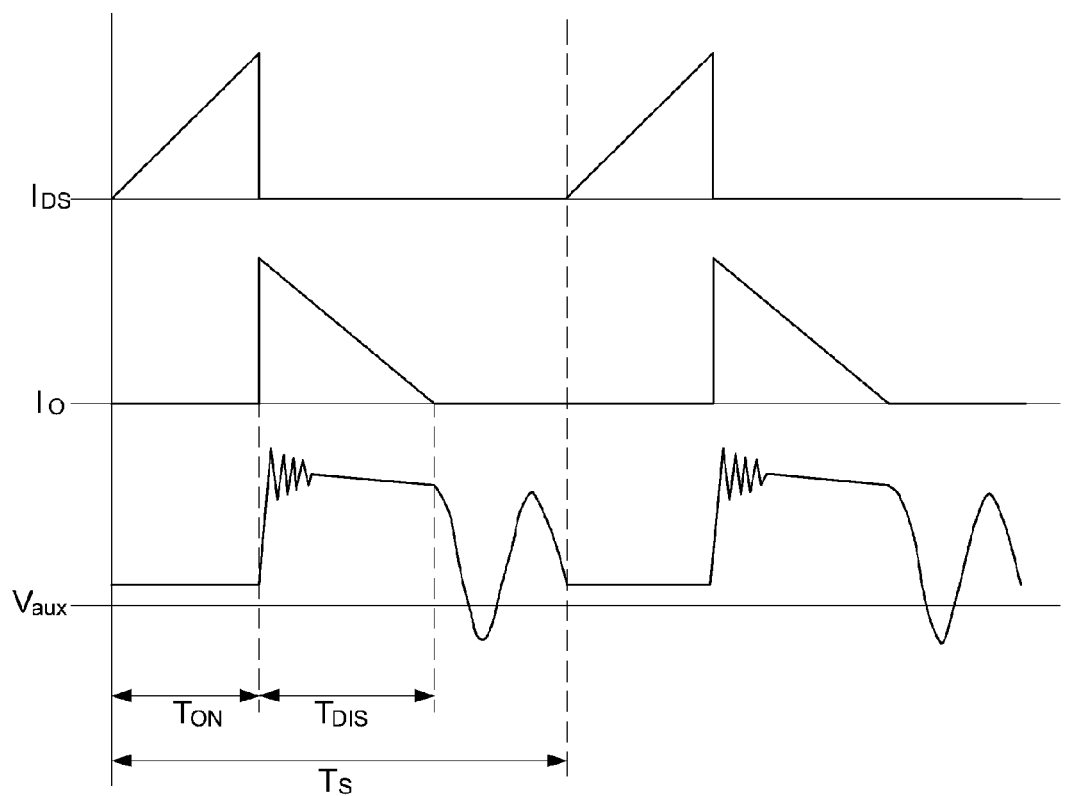
FIG. 2 is a graph showing main operation waveforms of the LED driving apparatus according to an exemplary embodiment of the present disclosure shown in FIG. 1.

FIG. 1 is a circuit diagram showing a schematic configuration of a light emitting diode (LED) driving apparatus according to an exemplary embodiment of the present disclosure; and FIG. 2 is a graph showing main operation waveforms of the LED driving apparatus according to an exemplary embodiment of the present disclosure shown in FIG. 1.

Referring to FIG. 1, an LED driving apparatus 100 according to an exemplary embodiment of the present disclosure may include a power converting unit 120 and a driving controlling unit 130, and may further include a rectifying unit 110 rectifying an input alternating current (AC) power and providing the rectified power to the power converting unit 120.

The power converting unit 120 may include a switch M switching the rectified power and a transformer inducing and outputting the switched power.

The switch M may switch the rectified power Vsup depending on a control of the driving controlling unit 130. In more detail, the switch M may switch the rectified power Vsup input to a primary winding P of the transformer T. To this end, the switch M may be connected between one end of the primary winding P and a ground, and the rectified power Vsup may be input to the other end of the primary winding P. The switch M may be turned on during a switching-on period $T_{ON}$ in a switching period Ts.

The transformer T may include the primary winding P, a secondary winding S, and an auxiliary winding Aux.

The transformer T may have a primary side and a secondary side on which electrical properties of a ground are different from each other, and the primary winding P and the auxiliary winding Aux may be formed on the primary side and the secondary winding S may be formed on the secondary side. In addition, the driving controlling unit 130 may be formed on the primary side.

Each of the primary winding P, the secondary winding S, and the auxiliary winding Aux may have a preset turn, the primary winding P and the secondary winding S may be magnetically coupled to each other to form a preset turn ratio therebetween, and the rectified power Vsup input to the primary winding P may be induced to the secondary winding S depending on the turn ratio through the switching of the switch M (lo).

The power induced to the secondary winding S may be stabilized by a diode and a capacitor of an output terminal and be then supplied to at least one light emitting diode LEDs. A plurality of light emitting diodes LEDs may be connected in series with each other. In addition, although not shown, a plurality of light emitting diode arrays may also be connected in parallel with each other.

The auxiliary winding Aux may form preset turn ratios together with the primary winding P and the secondary winding S, respectively, to receive the power induced from the primary winding P to the secondary winding S, thereby detecting state information of the power induced to the secondary winding S depending on the turn ratio.

A power Vaux SYNC detected by the auxiliary winding Aux may be transferred to the driving controlling unit 130.

In addition, the power converting unit 120 may include a leakage inductor Lk and a magnetization inductor Lm used for a power conversion switching operation, and may further include a snubber circuit Sn suppressing a power spike component at the time of performing the power conversion switching operation and a detection resistor Rcs for detecting a current $I_{DS}$ flowing in the switch M at the time of switching on the switch M.

The driving controlling unit 130 may include an operating unit 131 and a controlling unit 132.

The operating unit 131 may perform an operation on a reference voltage Vref for controlling the switching of the switch M of the power converting unit 120 based on the switching period Ts of the power converting unit 120 and a demagnetization time $T_{DIS}$ in the switching period.

To this end, the operating unit 131 may perform an operation on the rectified power Vsup, the switching period Duty of the switch M, and a drain voltage Vdrain by the switching to provide the reference voltage Vref.

Figure 3:
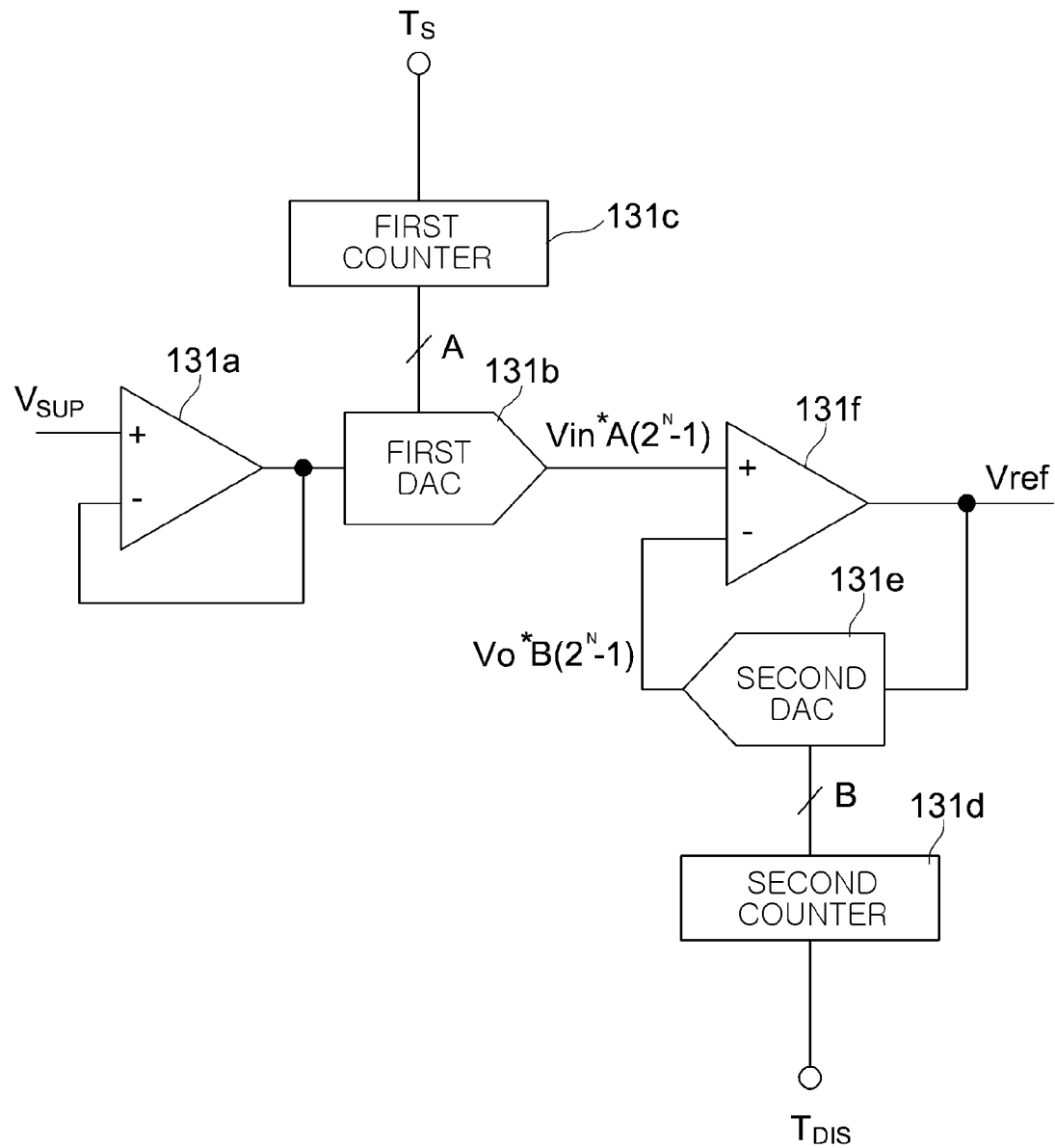
FIG. 3 is a block diagram showing a schematic configuration of an operating unit used in the LED driving apparatus according to an exemplary embodiment of the present disclosure shown in FIG. 1.

FIG. 3 is a block diagram showing a schematic configuration of an operating unit used in the LED driving apparatus according to an exemplary embodiment of the present disclosure shown in FIG. 1.

Referring to FIG. 3, the operating unit 131 may include a first operational amplifier 131a performing an operation on signals so that an output signal thereof conforms to a voltage level of the rectified power Vsup, a first counter 131c counting the switching period Ts of the switch M, a first digital to analog converter (DAC) 131b performing digital to analog conversion on the output signal of the first operational amplifier 131a depending on a count value A of the first counter 131c, a second counter 131d counting the demagnetization time $T_{DIS}$ of the switch M, a second operational amplifier 131e performing an operation on signals so that an output signal thereof conforms to an output signal of the first digital to analog converter 131b, and a second digital to analog converter 131f performing digital to analog conversion on the output signal of the second operational amplifier 131e depending on a count value of the second counter 131d and feeding a resultant signal back to the second operational amplifier 131e.

The above-mentioned operating unit 131 may serve to allow the output signal of the first digital to analog converter 131a and a reference voltage Vref of the second operational amplifier 131f to satisfy the following Equations.

$$V_{SUP}*A(2^N-1)=Vref*B(2^N-1)$$

$$Vref=V_{SUP}*A/B \qquad \text{(Equation)}$$

That is, a division operation is implemented in a digital scheme as in a configuration of the operating unit 131, such that noise resistance characteristics may be excellent and a separate external capacitor may not be used. Therefore, a circuit area and a manufacturing cost may be decreased, and a terminal for connection of the external capacitor is not required, such that the manufacturing cost may be further decreased.

The controlling unit 132 may include a first comparator OP1, a second comparator OP2, and an RS latch RS.

The first comparator OP1 may compare a signal level of the detected signal SYNC of the auxiliary winding Aux and a signal level of a preset reference signal ref with each other and transfer a comparison result to a set terminal S of the RS latch RS, and the second comparator OP2 may compare a voltage level of the reference voltage Vref of the operating unit 131 and a voltage level of a detected voltage detected by the detection resistor Rcs with each other and transfer a comparison result to a reset terminal R of the RS latch RS.

The RS latch RS may perform a logical operation depending on the comparison result of the first comparator OP1 input to the set terminal S and the comparison result of the second comparator OP2 input to the reset terminal R and provide a switching control signal GATE controlling switching-on/off of the switch M to the switch M through an output terminal Q thereof.

As set forth above, according to exemplary embodiments of the present disclosure, the switching of a power converting circuit is controlled based on a switching period of the power converting circuit and a demagnetization time in the switching period, that is, the division operation is implemented in the digital scheme as in the configuration of the operating unit 131, such that the noise resistance characteristics may be excellent and the separate external capacitor may not be used. Therefore, the circuit area and the manufacturing cost may be decreased, and the terminal for connection of the external capacitor is not required, such that the manufacturing cost may be further decreased.

While exemplary embodiments have been shown and described above, it will be apparent to those skilled in the art that modifications and variations could be made without departing from the spirit and scope of the present disclosure as defined by the appended claims.

What is claimed is:

1. A light emitting diode (LED) driving apparatus comprising:
 a power converting unit switching input power to supply driving power to at least one LED; and
 a driving controlling unit controlling a supply of the driving power from the power converting unit based on a switching period of the power converting unit and a demagnetization time in the switching period,
 wherein the driving controlling unit includes:
  an operating unit performing an operation on the input power, the switching period of the power converting unit, and a drain voltage by the switching to provide a reference voltage; and a controlling unit controlling the switching of the power converting unit based on a feedback signal indicating the detected driving power and the reference voltage from the operating unit.

2. The LED driving apparatus of claim 1, wherein the operating unit includes:
   a first counter counting the switching period of the power converting unit;
   a first operational amplifier performing an operation on signals so that an output signal thereof conforms to a voltage level of the input power;
   a first digital to analog converter performing digital to analog conversion on the output signal of the first operational amplifier depending on a count value of the first counter;
   a second counter counting the demagnetization time of the power converting unit
   a second operational amplifier performing an operation on signals so that an output signal thereof conforms to an output signal of the first digital to analog converter; and
   a second digital to analog converter performing digital to analog conversion on the output signal of the second operational amplifier depending on a count value of the second counter and feeding a resultant signal back to the second operational amplifier.

3. The LED driving apparatus of claim 1, wherein the controlling unit includes:
   a first comparator comparing a feedback signal of the power converting unit and a preset reference signal with each other;
   a second comparator comparing the reference voltage from the operating unit and a detected voltage of a switching current of the power converting unit with each other; and
   an RS latch having a set terminal receiving a comparison result of the first comparator and a reset terminal receiving a comparison result of the second comparator and performing a logical operation on signals input to the set terminal and the reset terminal to control the switching of the power converting unit.

4. The LED driving apparatus of claim 1, wherein the power converting unit includes:
   a switch switching the input power; and
   a transformer having a primary winding receiving the input power, a secondary winding having a preset turns ratio with the primary winding and receiving a power induced from the primary winding, and an auxiliary winding having a preset turns ratio with the primary winding, detecting power induced from the primary winding to the secondary winding, and feeding the detected power back to the driving controlling unit.

5. The LED driving apparatus of claim 4, wherein the transformer has a primary side and a secondary side on which electrical properties of a ground are different from each other, and
   the primary winding and the auxiliary winding are formed on the primary side and the secondary winding is formed on the secondary side.

6. The LED driving apparatus of claim 5, wherein the driving controlling unit is formed on the primary side.

7. The LED driving apparatus of claim 1, further comprising a rectifying unit rectifying an alternating current (AC) power to provide the input power to the power converting unit.

8. A LED driving apparatus comprising:
   a power converting unit switching input power to supply driving power to at least one LED; and
   a driving controlling unit controlling the supplying of the power of the power converting unit based on the input power, a switching period of the power converting unit, and a drain voltage by the switching,
   wherein the driving controlling unit includes:
      an operating unit performing an operation on the input power, the switching period of the power converting unit, and a drain voltage by the switching to provide a reference voltage; and
      a controlling unit controlling the switching of the power converting unit based on a feedback signal indicating the detected driving power and the reference voltage from the operating unit.

9. The LED driving apparatus of claim 8, wherein the operating unit includes:
   a first counter counting the switching period of the power converting unit;
   a first operational amplifier performing an operation on signals so that an output signal thereof conforms to a voltage level of the input power;
   a first digital to analog converter performing digital to analog conversion on the output signal of the first operational amplifier depending on a count value of the first counter;
   a second counter counting a demagnetization time of the power converting unit
   a second operational amplifier performing an operation on signals so that an output signal thereof conforms to an output signal of the first digital to analog converter; and
   a second digital to analog converter performing digital to analog conversion on the output signal of the second operational amplifier depending on a count value of the second counter and feeding a resultant signal back to the second operational amplifier.

10. The LED driving apparatus of claim 8, wherein the controlling unit includes:
    a first comparator comparing a feedback signal of the power converting unit and a preset reference signal with each other;
    a second comparator comparing the reference voltage from the operating unit and a detected voltage of a switching current of the power converting unit with each other; and
    an RS latch having a set terminal receiving a comparison result of the first comparator and a reset terminal receiving a comparison result of the second comparator and performing a logical operation on signals input to the set terminal and the reset terminal to control the switching of the power converting unit.

11. The LED driving apparatus of claim 8, wherein the power converting unit includes:
    a switch switching the input power; and
    a transformer having a primary winding receiving the input power, a secondary winding having a preset turns ratio with the primary winding and receiving a power induced from the primary winding, and an auxiliary winding having a preset turns ratio with the primary winding, detecting power induced from the primary winding to the secondary winding, and feeding the detected power back to the driving controlling unit.

12. The LED driving apparatus of claim 11, wherein the transformer has a primary side and a secondary side on which electrical properties of a ground are different from each other, and
    the primary winding and the auxiliary winding are formed on the primary side and the secondary winding is formed on the secondary side.

13. The LED driving apparatus of claim 12, wherein the driving controlling unit is formed on the primary side.

14. The LED driving apparatus of claim 8, further comprising a rectifying unit rectifying an AC power to provide the input power to the power converting unit.

* * * * *